United States Patent Office 2,922,747
Patented Jan. 26, 1960

2,922,747

DEODORANT COMPOSITION

James J. Scanlan, Hillsdale, N.J., assignor to American Chicle Company, a corporation of New Jersey No Drawing. Application June 14, 1957
Serial No. 665,666

5 Claims. (Cl. 167—93)

This application is a continuation in part of my application filed December 23, 1952, Serial No. 327,687, now abandoned.

This invention relates to deodorant compositions containing lipids as the effective deodorant.

It is also an object of this invention to provide a deodorant composition of matter having a lipid in a finely dispersed state in which the effectiveness is dependent upon the particle size of the lipid, the effect of a dispersing agent, and the combined effect of the dispersing agents and the lipids.

According to my invention simple lipids such as (a) neutral fats, which are the glycerol esters of the fatty acids, (b) waxes, which are the esters of monatomic alcohols higher than glycerol, (c) compound-lipids, such as phosphatides, cerebrosides and sulfolipids, and (d) derived lipids such as fatty acids, high molecular weight alcohols, and hydrocarbons are used in a finely divided emulsified state.

In preparing preferred compositions of this invention, a primary mixture of vegetable oils, or animal fats, or carotenoids, and/or waxes such as are commonly obtained in commerce, is dispersed into a secondary aqueous solution containing a surface-active water-soluble emulsifier. The emulsifiers that are suitable are, for example, Arlacel C (sorbitan sequioleate), Triton (alkylarylpoly ether alcohol), Spans (sorbitol derivatives of fatty acids), and others.

As an illustrative embodiment of the primary mixture the following composition is given:

| | Parts |
|---|---|
| Peanut oil | 40 |
| Lecithin | 2 |
| Triton (alkylarylpoly ether alcohol) | 0.2 |
| Water | 57.8 |

In lieu of Triton there may be used an equivalent amount of non-toxic dispersing agent or mixture of dispersing agents. Also in lieu of lecithin an emulsifier such as Arlacel C may be used. In the primary mixture given above the dispersing agent (Triton) is an optional ingredient and therefore is not essential to produce an effective primary mixture. Furthermore, in lieu of peanut oil there may be used other oils or substances, such as, corn oil, cottonseed oil, stearin, olein, sterols, waxes, or mineral oil.

The above composition is homogenized by efficient pre-mixing and passing through a colloid mill so that a true emulsion is formed in which at least 90% of the particles are about $0.1\mu$ in diameter. It has been found that the deodorization capacity of these materials is proportional to the particle size so that when the average particle size is about $0.1\mu$ or less in diameter, the emulsion is 2 to 10 times more effective, when tested by acceptable odor determination methods, than when the particle size ranges beyond 2 microns. My preferred range of particle sizes is from about $0.1\mu$ to about 2.0 microns.

The emulsified deodorant of this invention is to be incorporated into or carried by candy, and chewing gum; thereby functioning as a deodorant for oral cavity, since the emulsified deodorant adsorbs odor forming substances.

It has been found that the deodorization capacity of the primary mixture is enhanced greatly by adding an amount of sodium lauryl sulfoacetate (Lathanol LAL) equal to the amount of lipid or mineral oil present in the primary mixture. The function of this agent is to facilitate bringing together the odorant and deodorant.

As an illustrative embodiment of the secondary mixture the following composition is given:

SECONDARY MIXTURE

| | Parts |
|---|---|
| Water | 650 |
| Lathanol LAL (sodium alkyl aryl sulfonate) | 100 |

Other dispersing agents may be used in lieu of Lathanol.

The preferred final mixture may comprise the following formula:

| | Parts |
|---|---|
| Primary mixture | 250 |
| Secondary mixture | 750 |

The particle size of the final mixture is $0.1\mu$ to $2.0\mu$.

The final mixture may be prepared by adding the appropriate ingredients in water in the correct amounts followed by a colloidal dispersion of the added material, but the preparation of the final mixture by means of a primary and secondary mixture is preferable, since possible separation of the oil is thereby obviated, and a stable emulsion secured.

The primary mixture is effective by itself but is most effective when combined with the secondary mixture.

Preferably the primary and the secondary mixtures are separately mixed in, for example, Eppenbach homogenizers to obtain emulsions having a particle size of $1\mu$ to $4\mu$. Then this mixture is passed through an Eppenbach colloidal mill at a setting of 2 to 5 ten-thousandths of an inch until the final stable emulsion is obtained.

The following examples of deodorant compositions of this invention illustrate the products obtained therefrom.

*Example 1*

A deodorant chewing gum unit having the following composition was prepared:

| | Gram |
|---|---|
| Chewing gum center | 1.0 |
| Coating of sugar | 0.6 |
| Flavor constituent | 0.007 |
| Deodorant mixture (final) | 0.05 |

This composition eliminated bad breath in vivo.

The final deodorant composition preferably is carried by the coating of sugar.

*Example 2*

A deodorant candy tablet having the following composition was prepared:

| | Grams |
|---|---|
| Sugar (powdered) | 1.860 |
| Glucose aqueous, 44° Baumé | 0.040 |
| Flavor constituent | 0.008 |
| Final deodorant mixture | .05 |

Upon calculating the composition of the formulae disclosed using the units of Examples 1 and 2, it will be seen that each of these units contains about 5 milligrams of lipid, as will further appear from the following parts by weight of the "final deodorant mixture" therein.

CONTENT OF FINAL DEODORANT MIXTURE IN EXAMPLES 1 AND 2

| Examples | Type | Parts |
|---|---|---|
| No. 1 | Deodorant Chewing Gum | 3.02 |
| No. 2 | Deodorant Tablet | 2.55 |

In the examples, the content of "final deodorant mixture" in grams per piece of deodorant gum or per piece of deodorant candy tablet is expressed inasmuch as it is one or more of these single units which is employed by the user.

The amount of each ingredient of the "final deodorant mixture" that will be present in the "unit of use" or in each individual piece of gum or candy tablet, may be calculated as follows:

WEIGHT IN GRAMS OF EACH ITEM COMPRISING THE "FINAL DEODORANT MIXTURE" PER UNIT OF USE

| Ingredient | From Examples 1 or 2— Chewing Gum: Deodorant Tablet |
|---|---|
| | Gram |
| Peanut Oil | 0.0050 |
| Lecithin | 0.00025 |
| Triton | 0.000025 |
| Sodium Lauryl Sulfonate | 0.0050 |

Further examples are as follows:

*Example 3*

A candy coated chewing gum—

| | | |
|---|---|---|
| Gum center | 1,070 | mg. per piece |
| Coating syrup and sugar | 687 | |
| Flavor | 6.8 | |
| Certified color | 5.8 | mcg. |
| Copper chlorophyllin (water soluble) | 4.0 | (100% purity basis) |
| Lipid (dry basis) | 1.54 | |
| *Mixed with:* | | |
| Glucose | 0.77 | |
| Lecithin | 0.15 | |
| Triton | 0.04 | |
| Antioxidant (BHA) | 0.3 | mcg. |
| Total (objective weight) | 1,770 | mg. |

The lipid in the form of a 20% oil-in-water emulsion (and the stated materials with which it is mixed), and the chlorophyll are premixed with some of the coating syrup in a Norman mixer. The mixture thus prepared is dried by successive applications upon the gum center in the coating operations, by tumbling in a kettle, with dry air, as customary. The flavor may be applied in one or more of the successive applications, as desired, and the color applied as one of the final coatings.

*Example 4*

A candy coated chewing gum—

| | | |
|---|---|---|
| Gum center | 1,070 | mg. per piece |
| Coating syrup and sugar | 688 | |
| Flavor | 6.8 | |
| Certified color | 5.8 | mcg. |
| Copper chlorophyllin (oil soluble) | 1.0 | (100% purity basis) |
| "Attasorb" (Attapulgus fuller's earth made by Minerals and Chemicals Corp. of America) | 2.0 | |
| Lipid (dry basis) | 2.5 | |
| *Mixed with:* | | |
| Glucose | 0.77 | |
| Lecithin | 0.15 | |
| Triton | 0.04 | |
| Antioxidant (Tenox II) | 7.5 | mcg. |
| Total (objective weight) | 1,770 | mg. |

The Attasorb (2 parts) and oil-soluble chlorophyll (1 part) are first thoroughly blended in a Stokes granulation mixer. The lipid in the form of a 20% oil-in-water emulsion, and the stated materials with which it is mixed, and the chlorophyll-Attasorb blend, with some of the coating syrup, are mixed in a Norman mixer. The mixture thus prepared is dried by successive applications upon the gum center in the coating operations, by tumbling in a kettle, with dry air, as customary. The flavor may be applied in one or more of the successive applications, as desired, and the color applied as one of the final coatings.

*Example 5*

A tablet—

| | | |
|---|---|---|
| Sugar | 1,577 | mg. per piece |
| Corn syrup | 31 | |
| Flavor | 6.7 | |
| Magnesium stearate | 4.0 | |
| Copper chlorophyllin (water soluble) | 4.0 | (100% purity basis) |
| Lipid (dry basis) | 2.5 | |
| Total weight of tablet | 1,625 | mg. |

The chlorophyll is added into the batch mixer with the sugar and mixed. The lipid in the form of a 20% oil-in-water emulsion, glucose, and an additional amount of water are first stirred together and then added into the batch mixer, with the other ingredients. The customary tablet forming operations follow.

*Example 6*

A tablet—

| | | |
|---|---|---|
| Sugar | 1,577 | mg. per piece |
| Corn syrup | 31 | |
| Flavor | 6.7 | |
| Certified color | 0.93 | |
| Magnesium stearate | 4.0 | |
| Copper chlorophyllin (oil soluble) | 1.0 | (100% purity basis) |
| "Attasorb" | 2.0 | |
| Lipid (dry basis) | 2.5 | |
| Total | 1,625 | mg. |

The "Attasorb" (2 parts) and oil-soluble chlorophyll (1 part) are first thoroughly blended in a Stokes granulation mixer. The chlorophyll-"Attasorb" blend is added into the batch mixer with the sugar and mixed. The lipid in the form of a 20% oil-in-water emulsion, a 4% solution of the certified colors, the glucose and an additional amount of water are first stirred together and then added into the batch mixer, with the other ingredients. The customary tablet forming operations follow.

It is a factor that the oral cavity including the teeth and odor forming particles, minute or otherwise, carried thereby, are normally covered by molecular layers of salivary materials, and that the usual high viscosity of the saliva is a deterrent to penetration by deodorant materials. The lipid of my invention is accompanied by a sweetening agent capable of stimulating the taste buds of the oral cavity and causing a fresh flow of saliva with a decrease in viscosity, making it easier for the lipid to reach the odor-forming materials within the mouth. While natural sugars are shown in the examples, it is obvious that the normal synthetic substitutes having the same function are equivalents.

The wetting (surface active) agents which are specified for use in the compositions as set forth herein, have been employed over many years for numerous purposes.

Peanut oil is a vegetable oil which I specify as a lipid of suitable quality for use in preparing the products. It is, of course, an accepted item of food usage. As hereinbefore stated, other vegetable oils, i.e. lipids, can be employed, considering of course their suitability from a physiologic and stability viewpoint.

Lecithin is a phosphorus-containing complex lipid, naturally present in egg yolk, and generally manufactured from soy beans. It is employed extensively in many food products, as an emulsifier and as a stabilizer. Also, it is employed in chocolate as an agent to prevent "bloom." It is an accepted item of food usage.

Triton (alkylarylpolyether alcohol) is of a low order of toxicity. It has been approved for use, and is used, as an emulsifier in the preparation of high caloric dietary foods. In the proportions of use specified in the examples herein, Triton is accepted for usage and safe.

Sodium lauryl sulfate and sulfonate and sulfoacetate are surface active agents which have been employed as foaming or cleansing agents in tooth pastes, tooth powders, shampoos, etc., and as emulsifying aids in many pharmaceuticals. Sodium lauryl sulfate has been included in test diets of animals up to 1% without effect and sodium lauryl sulfoacetate to the extent of 0.1% [1,2].

The stated proportion of Triton in a given unit is 25 micrograms (1/2400 part of a grain) and of sodium lauryl sulfonate 0.0049 gram (1/12 part of a grain), quantities that represent a very limited intake, and acceptable and safe for the use stated.

The problem of understanding the deodorization by lipids or mineral oils has been formulated in terms of the physical adsorption on activated surfaces which results from the so-called van der Walls' attractive forces. Chemical reaction is generally excluded and the adsorbed molecules, being reversibly adsorbed, are partially released on heating the adsorbent.

The most reasonable approximation of the extent of adsorption may be determined by measuring the surface area of the lipids or mineral oil and calculating, for a monomolecular layer, the amount of adsorbate which can be held using X-ray data to establish the area of contact of the adsorbate to the adsorbent.

The accomplishment of deodorization depends on odor perception. The most recent theory of olfaction defines thirty levels of perception, which are called "just noticeable differences" or JND's, and which cover a change of the order of $10^5$ in concentration. The level of odor is, however, a multiple of the threshold concentration in air for odor detection and as a result the amount of material which must be removed is proportional to the odor threshold in air. Deodorization of sulfides, acids, amines, and aldehydes, which are the group of lowest odor threshold, can reasonably be accomplished by the active surface of emulsified lipids in accordance with the invention. As an alternative, the material as a powder may be used as such or in soluble unit containers, gelatin containers being an example.

Having described my invention what I claim and desire to secure by Letters Patent is as follows:

[1] Epstein, S., Throndson, A. H., Dack, W. and Tainter, M.L. J. A. Dent. As. 26 1461 (1939) thru Woodard, G. and Calvery, H.O. in Scien. Rpt., Toilet Goods As., 3 (1945).
[2] Allied Chemical and Dye Corp. Nacconal LAL Report No. 301,500 (1941).

1. A solid deodorant tablet for oral use, comprising a sweetening agent and a masticatory gum material capable of stimulating the taste buds of the oral cavity, and a non-toxic lipid having a particle size of from about $0.1\mu$ to about $2.0\mu$ and in amount sufficient to have substantial deodorant power in the mouth and not less than 1.54 mg.

2. A solid deodorant tablet for oral use, comprising a gum masticatory center, a coating of sugar and a lipid having its particles associated with particles of the sugar coating, the lipid having a particle size of from about $0.1\mu$ to about $2.0\mu$ and in amount sufficient to have substantial deodorant power in the mouth and not less than 1.54 mg.

3. A deodorant chewing gum having a masticatory gum center, a coating of sugar, a lipid having a particle size from about $1.0\mu$ to about $2.0\mu$ and in amount sufficient to have substantial deodorant power in the mouth and not less than 1.54 mg., and a surface acting agent adapted to facilitate bringing together an odorant and the lipid carried by the mouth of the user.

4. A solid deodorant tablet for oral use, comprising a sweetening agent capable of stimulating the taste buds of the oral cavity, chlorophyllin, and a non-toxic vegetable oil lipid having a particle size of from about $0.1\mu$ to about $0.2\mu$ and in amount sufficient to have substantial deodorant power in the mouth and not less than 1.54 mg.

5. A deodorant chewing gum unit having a masticatory gum center, a coating of sugar, chlorophyllin, and a lipid having a particle size from about $1.0\mu$ to about $2.0\mu$ and in amount sufficient to have substantial deodorant power in the mouth and not less than 1.54 mg.

References Cited in the file of this patent

UNITED STATES PATENTS

| Number | Name | Date |
| --- | --- | --- |
| 1,052,872 | Williams | Feb. 11, 1913 |
| 1,786,559 | Born | Dec. 30, 1930 |
| 2,303,932 | Guild | Dec. 1, 1942 |
| 2,304,246 | Ekert | Dec. 8, 1942 |
| 2,341,986 | Hale | Feb. 15, 1944 |

OTHER REFERENCES

Bodansky: "Introduction to Physiological Chem.," 4th ed., 1938, John Wiley and Sons, N.Y., pp. 621–623.

Avis: Am. J. Pharm., August 1947, pp. 271–282.

De Navarre: Chem. and Manuf. of Cos., Van Nostrand, N.Y., 1941, pp. 194–195.